United States Patent Office 3,552,843
Patented Jan. 5, 1971

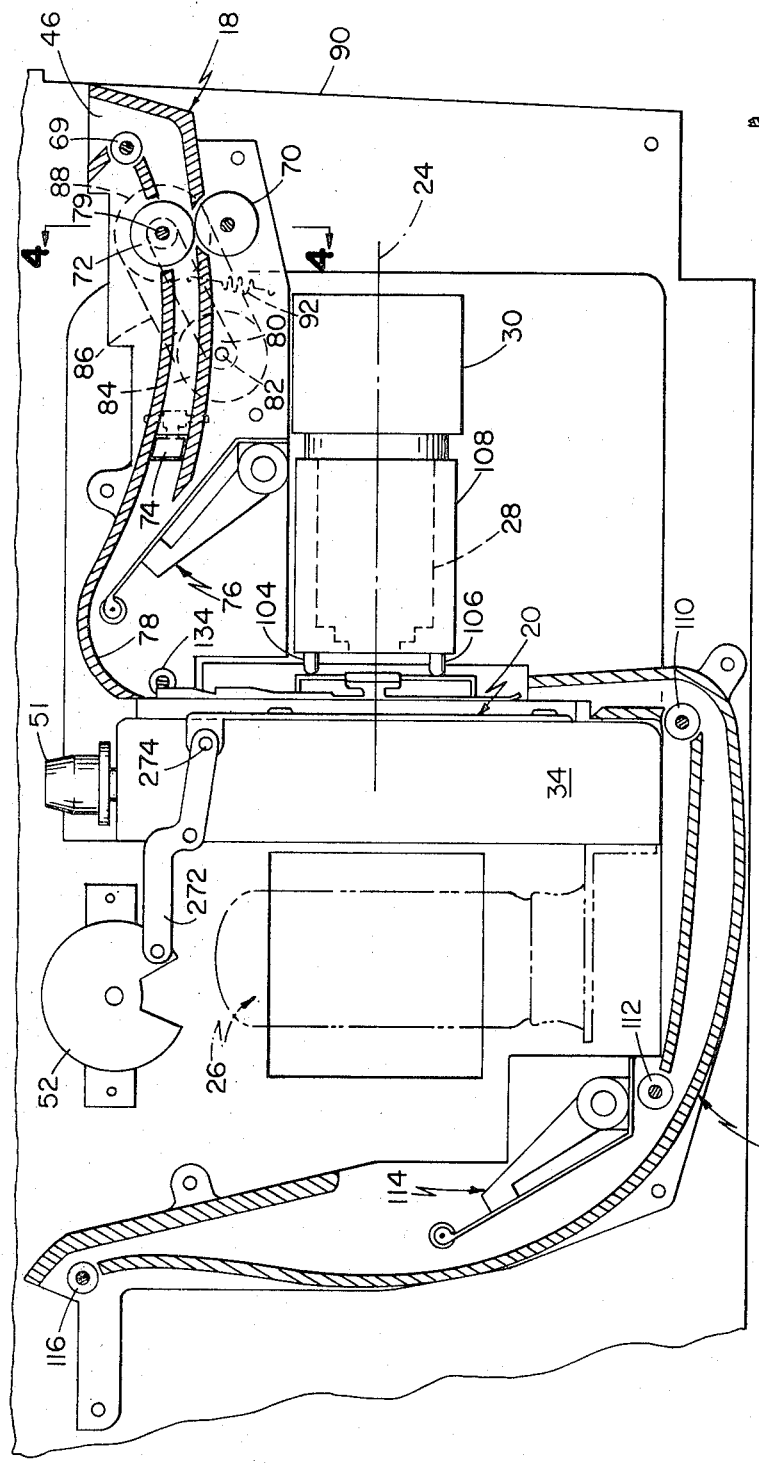
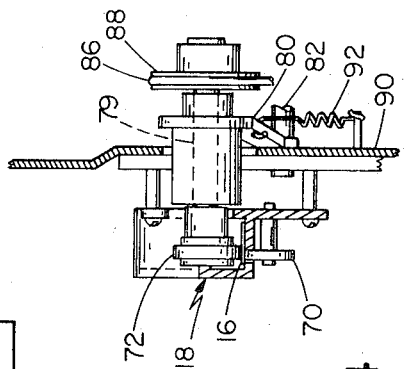
FIG 3
FIG 4

3,552,843
MOTION PICTURE PROJECTOR
Gary Kaess, Newton, and Robert G. Palmer, Canton, Mass., assignors, by mesne assignments, to Atlas-Rand Corporation, Clifton, N.J., a corporation of New Jersey
Filed Sept. 12, 1967, Ser. No. 667,208
Int. Cl. G03b 1/22
U.S. Cl. 352—191                                        10 Claims

ABSTRACT OF THE DISCLOSURE

A self-threading, sprocketless motion picture projector has a main claw drive which engages film just before the projection aperture. The pressure plate has an offset so that no significant resistance to film movement occurs prior to engagement by the claw. Also, an entrance side guide is pivoted into place by the film after its leading edge has passed the projection aperture. A rubber surfaced auxiliary drive roller mounted on a pivoted arm engages the film as it is introduced into the guide opening. This drive roller is lightly biased into contact with the film and is driven 5% faster than the claw drive. Main drive control includes an SCR circuit and adjustments that control the position and travel of the claw.

SUMMARY OF INVENTION

This invention relates to motion picture projectors and like apparatus of the type which employ, in a transducing operation, an elongated, flexible record member.

In apparatus of the type to which the invention relates, such as motion picture projectors, the record member must be controllably positioned at the transducing station and moved past that transducing station in the desired coordinated manner. In a conventional motion picture projector, two drive mechanisms are employed for moving the film, a first drive mechanism which intermittently moves the film through an optical path and a second drive mechanism, such as sprockets which operate continuously to feed the film to and take the film from the first drive mechanism. The coordination required between such drives introduces complexities both in the manufacture and the operation of such apparatus. Other complexities are frequently introduced when it is desired to be able to vary the film speed over a wide and continuous range of speeds. Still further complexities and interrelated problems are introduced where the projector is designed to accommodate more than one film format. Accordingly, it is an object of this invention to provide an improved motion picture projector which overcomes these limitations.

A more general object of this invention is to provide a novel and improved transducer apparatus incorporating a simplified record member drive arrangement which facilitates threading and drive of the record member in a reliable and economical manner.

Another specific object of the invention is to provide a novel and improved film positioning structure which imposes frictional and positioning restraints on the record member only after the record member has been engaged by the main drive mechanism immediately adjacent the transducing station.

A further object of the invention is to provide a novel and improved coordinated arrangement of auxiliary and main film drive mechanisms particularly advantageous in a motion picture projector of the "self-threading" type.

Still another object of the invention is to provide novel and improved mechanism for accommodating different film formats in a motion picture projector.

Still another object of the invention is to provide novel and improved motor control arrangements for varying, in a coordinated manner, the main and auxiliary drives in a motion picture projector.

A motion picture projector constructed in accordance with the invention includes a light source and a lens system that defines an optical path for projecting a beam of light as modified by film that is moved from an input guide structure through that light path at a transducing station to an output guide structure. Adjacent the transducing junction of the film path and the optical path is provided structure for imposing significant frictional restraint on the film to assure its proper positioning relative to the optical path. Immediately ahead of that junction there is provided a main drive for engaging the film to advance that film at a predetermined intermittent rate through the optical path for modifying the light in that optical path. This main drive supplies sufficient force to the film to overcome the frictional force applied by the positioning structure. Disposed in the input guide structure is a coordinated auxiliary drive that acts to drive the film continuously with a minimal force (substantially less than the force imparted by the main drive) at a speed slightly in excess of the rate of operation of the main drive. This continuously operating auxiliary overdrive is sufficient to advance the film through the input guide structure to the main drive but its frictional force is so small so that the auxiliary drive will slip and cannot overcome the frictional and guide restraints applied to the film by the positioning structure.

In a particular embodiment the positioning structure includes an aperture plate and a pressure plate juxtaposed on and forced against the aperture plate. The film path is between these two plates and the pressure of the plate applies positioning restraint to the film. The entrance ends of these juxtaposed plates are offset from one another adjacent the main drive engagement position a distance slightly greater than the thickness of the film so that minimal frictional resistance to the passage of the film is provided by these juxtaposed plates until the film is engaged by the main drive. Full positioning force is then applied by the juxtaposed plates. As a further feature of reducing the frictional force applied to the film prior to engagement by the main drive, an entrance edge guide is normally out of engagement with the film and structure responsive to movement of the film past the junction of the film path and the optical path moves the entrance edge guide into engagement with the edge of the film for proper positioning of that film relative to the optical path. The auxiliary drive in this particular embodiment is a resilient surfaced roller pivotally mounted on an arm and lightly biased into engagement with the film in the entrance guide structure. The direction of drive of this roller and its mounting are such that the frictional force imposed upon the film by the auxiliary drive is reduced when the film drive direction is reversed.

The preferred form of projector incorporating the invention further includes an edge guide structure which is fixed in position as a function of the format of the film being employed and this edge guide is shifted laterally to accommodate a different film format. For accommodating these different film formats the motion of the main drive must be oriented with precision relative to the film path and to that end an adjustment mechanism for the main drive includes a guide plate on which the main drive arm is pivotally mounted, which guide plate may be moved along a predetermined path for framing purposes and which predetermined path may be further adjusted in two mutually perpendicular directions relative to the projector structure for precise control of the adjustment of the main drive member relative to the film.

The main drive and auxiliary drives are driven by a common drive motor and the speed of that motor through a motor control circuit employing a silicon controlled rectifier and a saturable reactor control circuit is adjustable over a range of speed from 6 frames per second to 36 frames per second in a normal mode of operation and over a speed from 2 frames per second to 12 frames per second in a slow motion mode of operation. As will be seen from the following description of a particular embodiment, the invention provides an improved motion picture projector which is simple and reliable in operation which employs a simplified drive mechanism without the necessity of the use of sprockets as components of the principal drive system. The projector, in operation needs only to have the film fed manually to the auxiliary drive and it then automatically threads itself for operation over a speed range from 2 frames per second (in slow motion mode) to 36 frames per second. Adjustments are provided to permit accurate alignment of the main drive for plurality of film formats and the systems accommodate different formats in accurate, reliable manner.

Other objects, features, and advantages of the invention will be seen as the following description of a particular embodiment progresses, in conjunction with the drawings, in which:

FIG. 3 is a diagrammatic view illustrating (partly in section) the optical axis, film path and associated components employed in the projector shown in FIG. 1;

FIG. 4 is an enlarged sectional view of the auxiliary drive mechanism taken along the line 4—4 of FIG. 3;

DESCRIPTION OF PARTICULAR EMBODIMENT

Figure 1:
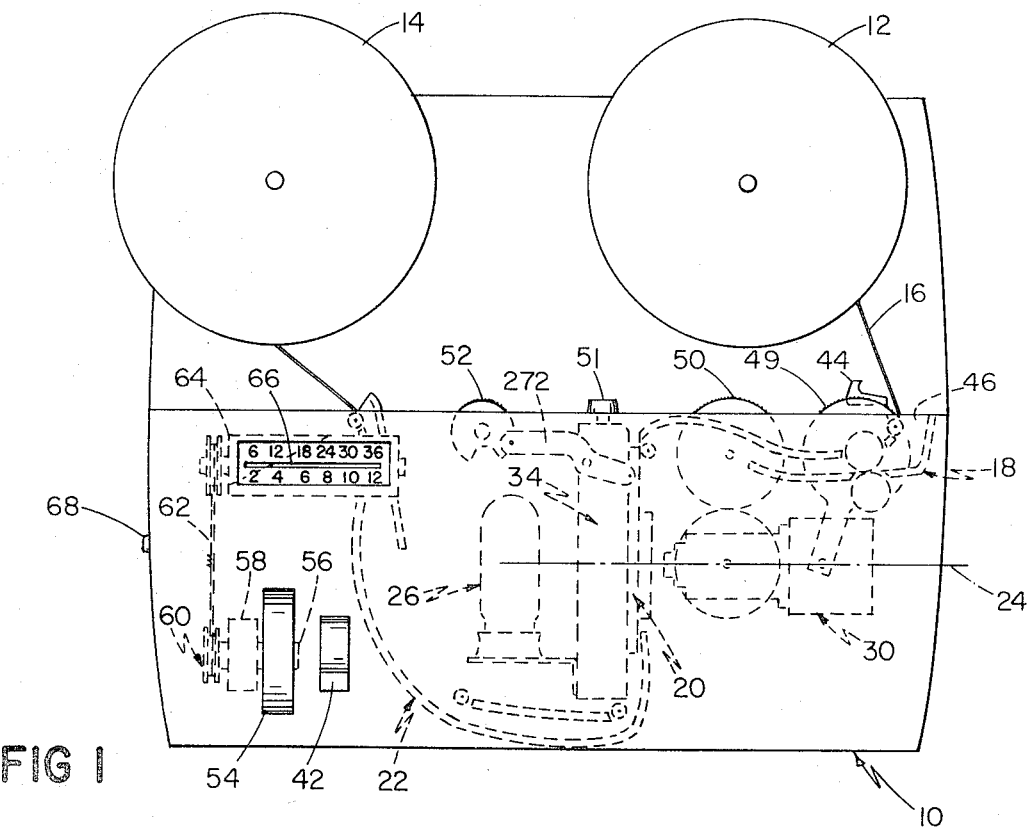
FIG. 1 is a side view of a motion picture projector constructed in accordance with the invention.
Figure 2:
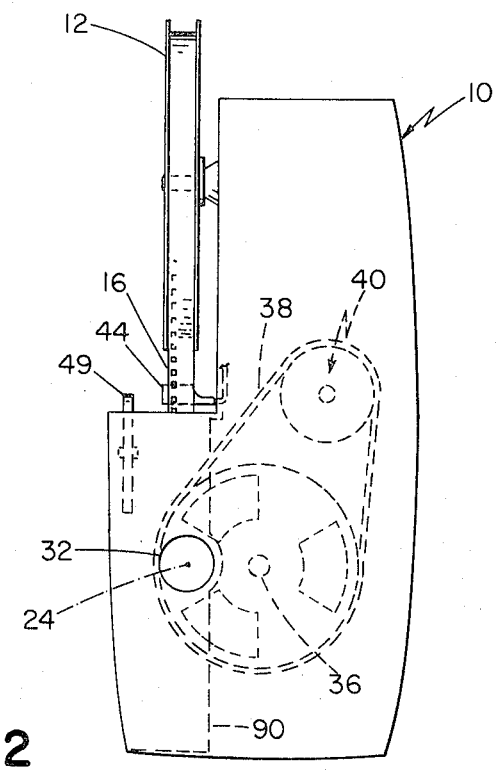
FIG. 2 is a front view of a motion picture projector shown in FIG. 1.

With reference to FIG. 1, the motion picture projector there shown includes a case 10 on which is mounted a supply reel 12 and a take-up reel 14 for supplying motion picture film 16 along a film path that includes an entrance guide structure 18, a film positioning structure 20 and an exit guide structure 22. An optical path 24 intersects the film path at the positioning structure, which optical path is defined by a light source 26 and a lens system 30. As indicated in FIG. 2, the optical path 24 passes through an exit aperture 32 in the front wall of the projector casing 10. Also interposed in the optical path 24 is a shutter structure mounted in housing 34 (FIG. 1) behind the film positioning structure 20 which shutter is mounted on shaft 36, that in turn is driven via belt 38 by drive motor 40.

Controls on the projector include a main control switch 42; a rewind control lever 44 (which in its rewind forward position overlies the entrance aperture 46 to the entrance guide structure 18); a zoom lens control 49; a focusing control 50; a framing adjust control 51; a format shift control 52; and a speed control 54. Speed control disc 54 is mounted on the shaft 56 of speed control potentiometer 58 and a drive pulley 60 for belt 62 which drives cylinder 64 that is mounted behind indicator window 66. Two speed scales are indicated adjacent window 66, the upper speed scale indicating the film drive speed in normal mode of operation (6–36 frames per second) and the lower speed scale indicating film drive speed in slow motion mode (2–12 frames per second) which modes are selected by control 68 that is mounted on the rear wall of the projector casing 10.

Other components within the projector casing 10 include conventional elements such as a fan motor and the drives for the supply and take-up reels 12, 14 which are driven from shaft 36.

Additional details of the film path defining structures are indicated in FIG. 3. The entrance guide structure 18 of that path conducts film from entrance aperture 46 past entrance roller 69 and between a support roller 70 and a juxtaposed auxiliary drive roller 72, a control switch actuator 74 for controlling energization of lamp 26, and a snubber structure 76 which biases film against the concavely curved surface 78 of the entrance guide structure 18 adjacent its outlet end.

As indicated in FIGS. 3 and 4 the auxiliary drive roller 72 has a rubber surface and is mounted on shaft 79 which in turn is mounted on arm 80 for pivoting about shaft 82 on which a belt drive pulley 84 is also mounted. Belt 86 extends from pulley 84 to pulley 88 which drives shaft 79 on which the auxiliary drive roller 72 is secured. Biasing spring 92, connected between the center frame member of the projector casing 90 and arm 80 imposes a light biasing force which urges film drive roller 72 into contact wtih support roller 70. It will be noted that the direction of rotation of the drive roller 72 is clockwise in the forward drive direction which increases the pressure of roller 72 on the film 16 in the forward drive direction but reduces the pressure imposed on the film when roller 72 is driven in the reverse direction.

The film positioning structure 20 adjacent the optical path 24 includes an aperture plate structure 100 mounted on the face of housing 34 and a juxtaposed pressure plate structure 102 which is urged toward aperture plate 100 by biased pins 104, 106 which protrude from the lens housing 108. Additional details of this positioning structure may be seen with reference to FIGS. 5 and 6.

The exit guide structure 22 receives film from the positioning structure 20 and includes roller 110 at its entrance end, a second roller 112 which provides transition to a snubber structure 114, and a third roller 116 at its exit end. This exit guide structure transfers film from the structure 20 that properly positions the film in the optical path 24 to the take-up reel 14.

Figure 6:
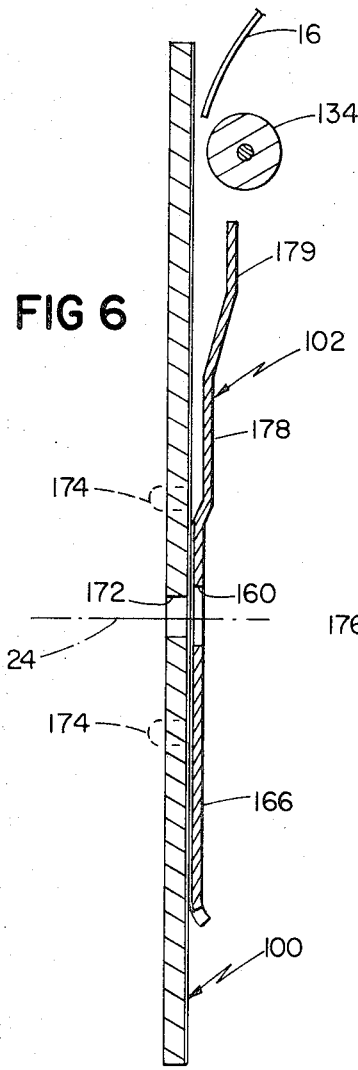
FIG. 6 is a sectional view taken along the line 6—6 of FIG. 5.
Figure 5:
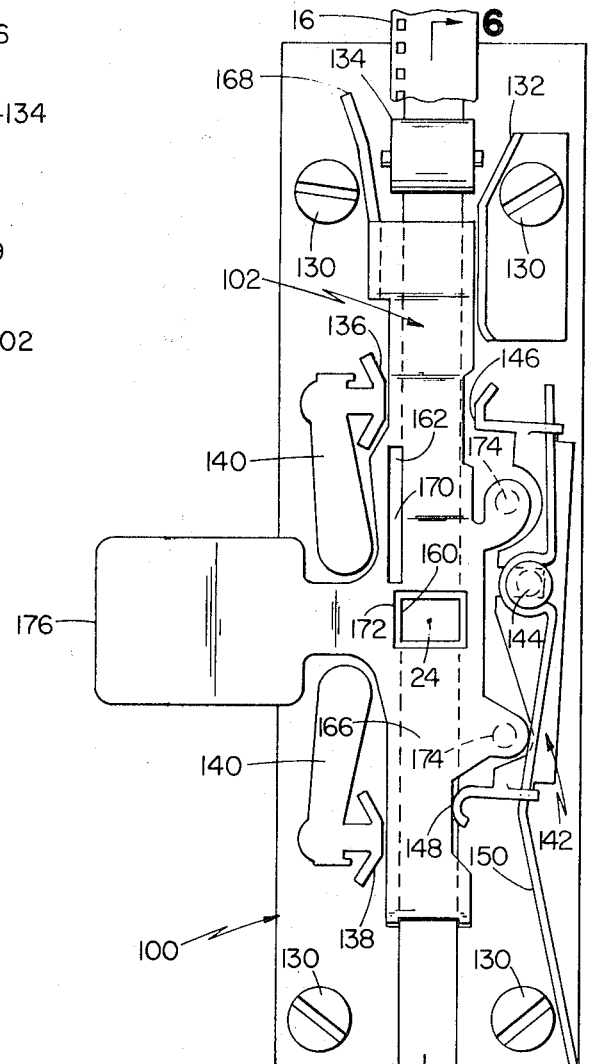
FIG. 5 is a front view of the aperture and pressure plate structures employed in the projector shown in FIG. 1.

Details of the aperture plate-pressure plate structure for positioning the film relative to the optical path 24 are indicated in FIGS. 5 and 6. The aperture plate 100 is secured to face of housing 34 by screws 130, one screw also securing a fixed entrance edge guide 132 at the entrance end of the film path defined by the aperture plate 100 and pressure plate 102. Also mounted on the aperture plate structure is an entrance roller 134 which guides the film into the entrance between the pressure plate 102 and the aperture plate 100; a set of edge guide surfaces 136, 138, each of which is mounted on a pivoted arm 140 which arms are biased to the left as viewed in FIG. 5; and a complementary edge guide unit 142 which is mounted on pivot 144 and includes edge guide surfaces 146 and 148. Edge guide unit 142 is biased to the position shown in FIG. 5 by spring 150. Thus the guide unit 142 is pivoted about stud 144 in the clockwise direction so that lower edge guide surface 148 is moved into the film path and upper edge guide surface 146 is moved out of that film path.

Disposed in aperture plate 100 is a main light beam defining aperture 160 and an elongated slot 162 disposed above aperture 160 through which the operative claw of the main (intermittent) film drive mechanism moves.

The pressure plate 102 includes an elongated body portion 166 which overlies the film path on the aperture plate; an entrance edge guide portion 168 that is opposed to fixed edge guide surface 132; an elongated slot 170 which is aligned with slot 162 in the aperture plate; and an aperture 172 that is slightly larger than and aligned with aperture 160 in the aperture plate 100 when plate 102 is in proper position. Rearwardly projecting studs 174 are received in holes in the aperture plate for positioning the pressure plate 102 relative to the aperture plate 100 as urged by pins 104, 106 (FIG. 3). Handle 176 allows the pressure plate to be removed for adjustment or access to the aperture area as desired.

As indicated in FIG. 6, plate 102 has an offset section 178 just above aperture 160 so that a space greater than the thickness of film 16 is provided, which space overlies part of slot 162. A second offset section 179 of greater magnitude above offset section 178 provides an entrance guide for the film to the positioning structure 20.

Figures 7, 8:
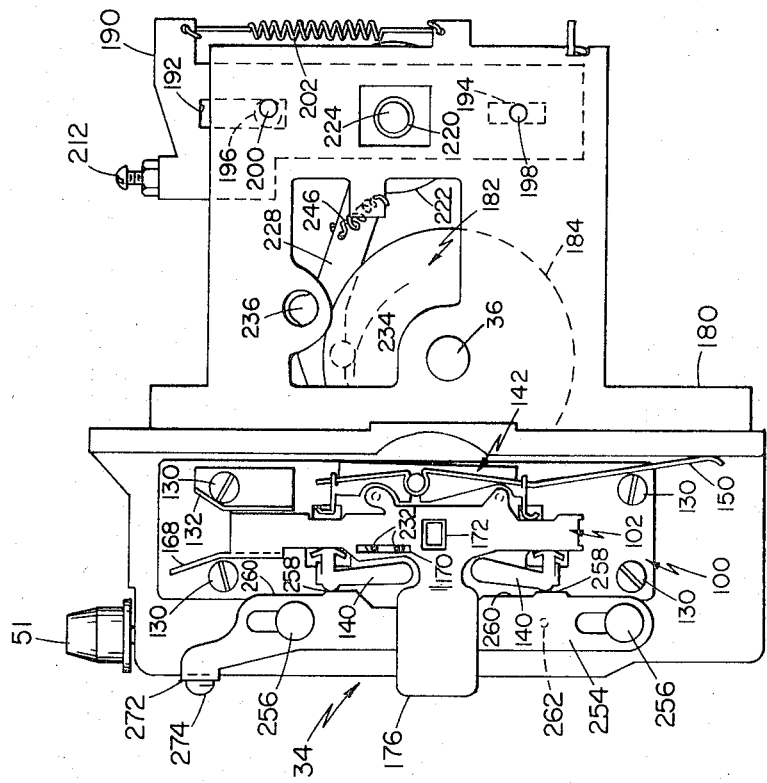
FIG. 7 is a rear elevational view showing details of the main drive mechanism and associated components employed in the projector shown in FIG. 1.
FIG. 8 is a front elevational view of the structure shown in FIG. 7.

Further details of the film drive mechanism and its cooperation with the aperture and pressure plates will be seen with reference to FIGS. 7 and 8. In those figures, the main support plate 180 on which the shutter housing 34 and aperture plate 100 are mounted is indicated in somewhat simplified form. That plate extends rearwardly from the shutter housing 34. The drive shaft 36, supported on plate 180 as indicated in FIG. 8, carries a cam 182 that has two cam surfaces, a face cam surface 184 and an edge cam surface 186.

Also mounted on plate 180 is a framer component 190 which includes two rectangular slots 192 and 194 each of which receives a stud 196, 198 respectively which are carried by plate 180. Stud 196 is mounted on an excentric 200 so that rotation of the excentric adjusts the lateral position of stud 196 and moves plate 190 relative to plate 180. The cooperation of studs 196, 198 with slots 192, 194 control the generally vertical motion of the plate 190, which plate is biased downwardly by spring 202, the upper end of which is secured to plate 190 and the lower end of which is secured to plate 180. This downward biasing force is opposed by a rocker arm 204 which is pivoted at 206 on plate 180. End 208 of the rocker arm is engaged by framing adjustment member 51 while end 210 of the arm is engaged by adjustment screw 212 that is carried by plate 190. Adjustment screw 212 provides an initial setting of the position of plate 190 relative to plate 180 while adjustment 51 allows the projector operator to adjust the generally vertical position of plate 190.

Also mounted on the plate 190 is a bushing 220 (FIG. 8) which receives the threaded shaft portion 224 of disc 222. Mounted on disc 222 at pivot 226 is claw arm 228. Extending outwardly from either side of pivot 226 are tabs 230 which bear against the surface of disc 222. Rotation of disc 222 adjusts the extent of engagement of the claw arm 228 with the film ((perpendicular to the plane of FIGS. 7 and 8).

At the opposite end of claw arm 228 from pivot 226 are provided two claw projections 232 which are aligned with slot 162 and move through that slot to engage the film 16 and advance that film intermittently past the aperture 160. Intermediate the ends of arm 228 is a cam follower 234 which engages cam surfaces 184, 186 to produce the requisite motion of claws 232 to provide the intermittent advance of the film 16. A surface 236 on arm 228 engages a slow motion mechanism (not shown) which in slow motion mode, limits the engagement of the claw and the film to every third cycle. Spring 240 mounted on stud 242 biases arm 228 downwardly as coupled by link 244 while spring 246 biases claw arm 228 inwardly to maintain engagement of followers 234 with cam surface 184.

The side guide structures 136 and 138 mounted on arms 140 are biased to the left as viewed in FIG. 8 by spring 250 (shown in FIG. 7) which is mounted on stud 252. The rotation of the arms 140 to the left as indicated in FIG. 8 is controlled by plate 254 which is secured on studs 256. Plate 254 has two raised surfaces 258 which limit the rotation of arms 140 to the left when plate 254 is positioned as shown in FIG. 8. When plate 254 is moved downwardly, recessed surfaces 260 contact arms 140 and allow the guide surfaces 136, 138 to move further to the left in a film shifting operation to accommodate a different format. Also secured to plate 254 is a pin 262 which engages a link 264 mounted for pivoting movement at 266 on the rear of aperture plate 100. Link 264 carries a masking aperture 268 of smaller dimensions than aperture 160 and when plate 254 is moved downwardly mask 268 is aligned with aperture 160 as controlled by adjustable stop member 270 to accommodate a different frame area on the film 16. Plate 254 is shifted by control 52 (FIG. 1) via the linkage 272 which is connected to tab 274 at the upper end of plate 254.

Figure 9:
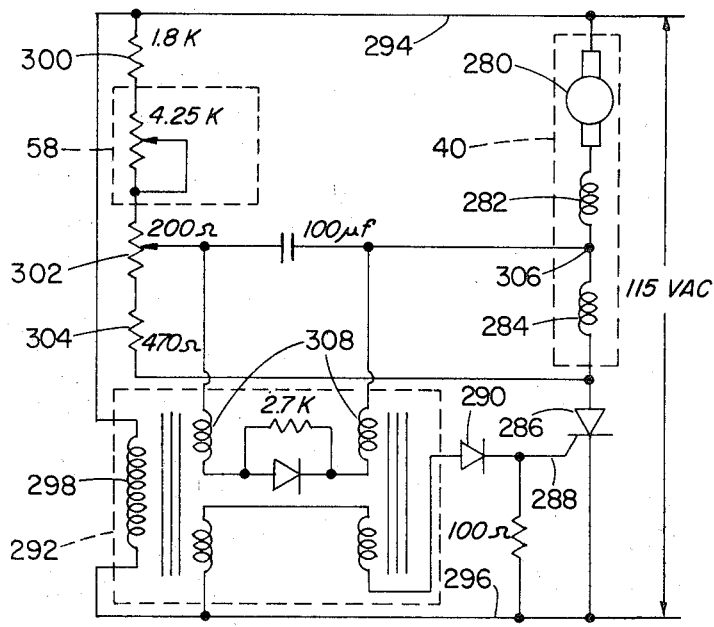
FIG. 9 is a schematic diagram of motor drive circuitry employed in the projector shown in FIG. 1.

The circuit for controlling motor 40 is shown in FIG. 9. The motor includes an armature 280 and two series connected field windings 282, 284 which are connected in series with a silicon controlled rectifier 286. The speed of the motor 40 is controlled by the portion of the cycle in which rectifier 286 is conducting. Connected to the control electrode 288 of the rectifier 286 via diode 290 is a saturable reactor circuit 292 to which the 115 volt AC signal on busses 294, 296 is supplied. A rector control signal as a function of the setting of potentiometer 58 (connected in voltage dividing network with resistors 300, 302 and 304) and the voltage at tap 306 between field windings 282 and 284 is applied as an input signal to two control windings 308 of the saturable reactor circuit and that circuit produces an output which controls the duration of conduction of rectifier 286 in each cycle. The resulting motor speed (as controlled by potentiometer 58) is directly indicated by the cylinder 64 relative to aperture 66.

In operation of the projector, with the main control switch 42 on and rewind control 44 in the inoperative (rear) position, the leading edge of the film 16 is introduced into aperture 46 of the entrance guide structure 18 and fed past roller 69 until it is engaged by the auxiliary drive roller 72. That roller is driven by drive motor 40 at a constant speed approximately 5% faster than the rate of feed of the main (intermittent) drive mechanism of claw 232. The film is thereafter fed by roller 72 past lamp switch control 74 (turning on lamp 26) and snubber 76 to the upper end of the film positioning assembly 20. There it is fed past roller 134 into the entrance offset 179 and down to the guide offset 178 so that when it is in offset 178 the upper claw 232 engages a perforation in the film and pulls the film past the aperture 160, overcoming the substantial frictional force imposed by the juxtaposed aperture and pressure plates 100, 102 adjacent aperture 160. The film is thereafter fed into the exit guide channel 22 and out the end of it for attachment to the take-up reel 14. Auxiliary drive roller 72 is coordinated with the action of snubber 76 so that a loop of adequate size is provided between auxiliary drive 72 and main drive elements 232 to compensate for their differential feed rate but auxiliary drive roller 72 does not impart sufficient drive force to the film to interfere with the proper operation of the main drive 232.

After the film is advanced past the aperture 160 by the main drive, it moves between guide surface 148 and juxtaposed surface 138 and the film width acts to rotate the edge guide structure 142 counterclockwise as viewed to position the upper guide 146 against the edge of the film so that the film is properly positioned laterally both above and below aperture 160. It will be seen that significant resistance is not imposed on the film movement into positioning structure 20 until the film is engaged by the main drive claw 232. Only after the film is engaged for driving by that claw are substantial guide restraints and positioning forces imposed on the film. Prior to that time the auxiliary drive provides sufficient force to feed the film and after that time the film is moved through the positioning structure by the main drive.

As indicated above, the main drive is accurately positioned relatively to the drive perforations in the film by means of the framer plate assembly which has a first adjustment which controls the amount of engagement of the claw with the film via rotation of disc 222; a second adjustment which controls the position of the claws 232 as they engage the film via adjustment knob 51 and rocker arm 204 in a framing operation; and a third adjustment which controls the lateral position of the claw drive member 232 via excentric 200.

Further, the projector accommodates two different film formats, a "Regular 8" format and a "Super 8" format for example, through control 52, link 272 and plate 254 which simultaneously positions side guide surfaces 136, 138 and selects a mask 268 for juxtaposition with aperture 160.

The projector further includes a motor control employing a silicon control rectifier circuit which provides uniform continuous adjustment of speed over a range of 6 frames per second to 36 frames per second as indicated by cylinder 64 which is directly coupled to the speed control 58 and provides a direct indication of the speed setting of the projector. Further, a slow motion speed one-third of the normal speed may be selected through operation of selector knob 68.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. In a sprocketless motion picture projector having a film path defined by an entrance guide structure, a film positioning structure and an exit guide structure, and an optical path defined by a light source and a lens system for projecting a beam of light through an aperture in said positioning structure for modification by film disposed in said positioning structure, said light path intersecting said film path at a junction, a main drive located between said junction and said entrance guide structure for engaging the film to advance that film at a predetermined intermittent rate through the optical path for modifying the light in that optical path, said main drive including an intermittent drive mechanism which advances the film at a predetermined average rate, and an auxiliary drive for acting on film in said entrance guide structure throughout operation of the projector in the forward direction and tending to advance the film continuously at a slightly faster rate than said predetermined average rate, said film positioning structure including juxtaposed pressure and aperture plates at the junction of said film path and said optical path for imposing positioning restraint on the film, said pressure plate having an offset between said junction and said entrance guide structure for defining an entrance recess between two opposed parallel surfaces of said pressure and aperture plates having a width slightly greater than the thickness of the film for guiding the film into engagement with said main drive while imposing no frictional restraint on the film said offset extending to a point between said main drive and said junction so that the frictional restraint imposed on the film by said film positioning structure is imposed only after said main drive has engaged the film.

2. In a motion picture projector having a film path defined by an entrance guide structure, a film positioning structure and an exit guide structure, and an optical path defined by a light source and a lens system for projecting a beam of light through an aperture in said positioning structure for modification by film disposed in said positioning structure, said light path intersecting said film path at a junction, and a main drive located between said junction and said entrance guide structure for engaging the film to advance that film at a predetermined intermittent rate through the optical path for modifying the light in that optical path, said film positioning structure at the junction of said film path and said optical path including a first portion for imposing positioning restraint on the film and a second portion between said junction and said entrance guide structure for defining an entrance recess having a width slightly greater than the thickness of the film for guiding the film into engagement with said main drive while imposing no significant friction restraint on the film so that the frictional restraint i;mposed on the film by said film positioning structure is imposed only after said main drive has engaged the film, said main drive including an intermittent drive mechanism which advances the film at a predetermined average rate and an auxiliary drive for acting on film in said entrance guide structure throughout operation of the projector and tending to advance the film continuously at a slightly faster rate than said predetermined average rate, said auxiliary drive structure including a rotatable film drive member, an arm supporting said drive member, a pivot axis for mounting said arm for pivoting rotation at a point remote from said drive member about an axis parallel to the axis of rotation of said drive member, a second drive member mounted for rotation about the axis of said arm, and a resilient drive belt coupling said film drive member and said second drive member for transferring rotational energy from said second drive member to said film drive member.

3. In a motion picture projector having a film path defined by an entrance guide structure, a film positioning structure and an exit guide structure, and an optical path defined by a light source and a lens system for projecting a beam of light through an aperture in said positioning structure for modification by film disposed in said positioning structure, said light path intersecting said film path at a junction, and a main drive located between said junction and said entrance guide structure for engaging the film to advance that film at a predetermined intermittent rate through the optical path for modifying the light in that optical path, said film positioning structure at the junction of said film path and said optical path including a first portion for imposing positioning restraint on the film and a second portion between said junction and said entrance guide structure for defining an entrance recess having a width slightly greater than the thickness of the film for guiding the film into engagement with said main drive while imposing no significant friction restraint on the film so that the frictional restraint imposed on the film by said film positioning structure is imposed only after said main drive has engaged the film, said main drive including an intermittent drive mechanism which advances the film at a predetermined average rate and an auxiliary drive for acting on film in said entrance guide structure throughout operation of the projector and tending to advance the film continuously at a slightly faster rate than said predetermined average rate, said main drive being powered by an electric motor and including a motor speed control circuit including a silicon controlled rectifier and a saturable reactor circuit connected to the control electrode of said silicon controlled rectifier for controlling the conduction of said rectifier as a function of the voltage produced by said motor and a control voltage provided by a voltage dividing network.

4. The motion picture projector as claimed in claim 3 wherein said motor control circuit includes a potentiometer in said voltage dividing network and an indicator coupled to said potentiometer shaft and rotatable in response to rotation of said potentiometer shaft for providing a direct indication of the selected motor speed as determined by the setting of said potentiometer.

5. A motion picture projector having a film path defined by an entrance guide structure, a film positioning structure and an exit guide structure, and an optical path defined by a light source and a lens system for projecting a beam of light through an aperture in said positioning structure for modification by film disposed in said positioning structure, said light path intersecting said film path at a junction, a main drive located between said junction and said entrance guide structure for engaging the film to advance that film at a predetermined intermittent rate through the optical path for modifying the light in that optical path, and an auxiliary drive for acting on film in said entrance guide structure throughout operation of the projector and tending to advance the film continuously at a slightly faster rate than said predetermined average rate, said auxiliary drive structure including a rotatable film drive member, an arm supporting said drive member, a pivot axis for mounting said arm for pivoting rotation at a point remote from said drive member about an axis parallel to the axis of rotation of said drive member, a second drive member mounted for rotation about the axis of said arm, and a resilient drive belt coupling said film drive member and said second drive member for transferring rotational energy from said second drive member to said film drive member.

6. The motion picture projector as claimed in claim 5 further characterized in that said film positioning structure includes juxtaposed pressure and aperture plates and said second portion is defined by an offset formed in said pressure plate, a first side guide structure for providing lateral guidance for the movement of the film past said junction, said side guide structure includes a member having an upper guide surface and a lower guide surface, biasing structure for moving said lower guide surface into the path of the film at a point below said aperture so that the edge of the film as it is moved past said aperture by said main drive means contacts said lower guide surface and moves said lower guide surface out of the path of the film and simultaneously moves said upper guide surface into proper film guiding position, and means responsive to the movement of film past said junction for moving said side guide structure into engagement with the edge of the film for imposing lateral guidance force on said film.

7. The motion picture projector as claimed in claim 6 and further including a second side guide structure on the opposite side of the film path from said first side guide structure, and means to shift said second side guide structure and to change the dimensions of said aperture as a function of the format of the film being used in the projector.

8. A motion picture projector having a film path defined by an entrance guide structure, a film positioning structure and an exit guide structure, and an optical path defined by a light source and a lens system for projecting a beam of light through an aperture in said positioning structure for modification by film disposed in positioning structure, said light path intersecting said film path at a junction, a main drive located between said junction and said entrance guide structure for engaging the film to advance that film at a predetermined intermittent rate through the optical path for modifying the light in that optical path, an electric motor for powering said main drive, and a motor speed control circuit including a silicon controlled rectifier and a saturable reactor circuit connected to the control electrode of said silicon controlled rectifier for controlling the conduction of said rectifier as a function of the voltage produced by said motor and a control voltage provided by a voltage dividing network.

9. A motion picture projector having a film path defined by an entrance guide structure, a film positioning structure and an exit guide structure, and an optical path defined by a light source and a lens system for projecting a beam of light through an aperture in said positioning structure for modification by film disposed in said positioning structure, said light path intersecting said film path at a junction, a main drive located between said junction and said entrance guide structure for engaging the film to advance that film at a predetermined intermittent rate through the optical path for modifying the light in that optical path, and an auxiliary drive for acting on film in said entrance guide structure throughout operation of the projector in the forward direction and tending to advance the film continuously at a slightly faster rate than said predetermined rate, said auxiliary drive structure including a rotatable film drive member, a film engaging member disposed on the opposite side of the film path from said film drive member at said entrance guide structure, at least one of said members having a resilient film engaging surface, said film drive member and said film engaging member being urged towards one another so that both members engage the film for continuously imparting a drive force to the film throughout operation of the projector in the forward direction, said drive force tending to advance the film continuously at a slightly faster rate than said predetermined rate.

10. The motion picture projector as claimed in claim 9 wherein said main drive is powered by an electric motor and further including a motor speed control circuit including a silicon controlled rectifier and a saturable reactor circuit connected to the control electrode of said silicon controlled rectifier for controlling the conduction of said rectifier as a function of the voltage produced by said motor, a control voltage provided by a voltage dividing network, a potentiometer in said voltage dividing network and an indicator coupled to said potentiometer shaft and rotatable in response to rotation of said potentiometer shaft for providing a direct indication of the selected motor speed as determined by the setting of said potentiometer.

References Cited

UNITED STATES PATENTS

| 1,361,123 | 12/1920 | Wenderhold | 352—158 |
| 2,228,855 | 1/1941 | Sperry | 352—224 |
| 2,521,957 | 9/1950 | Wittel | 226—65 |
| 3,129,633 | 4/1964 | Mees | 352—224 |
| 3,136,209 | 6/1964 | Briskin | 352—158 |
| 3,338,490 | 8/1967 | Hara | 226—64 |
| 3,410,639 | 11/1968 | Chandler | 352—194 |
| 3,439,980 | 4/1969 | Teshi | 352—224X |

JOHN M. HORAN, Primary Examiner

M. H. HAYES, Assistant Examiner

U.S. Cl. X.R.

226—64; 352—80, 158, 224, 225, 229